Oct. 1, 1968    J. W. LIGHT    3,403,477
DOOR CONSTRUCTION
Filed Sept. 14, 1966
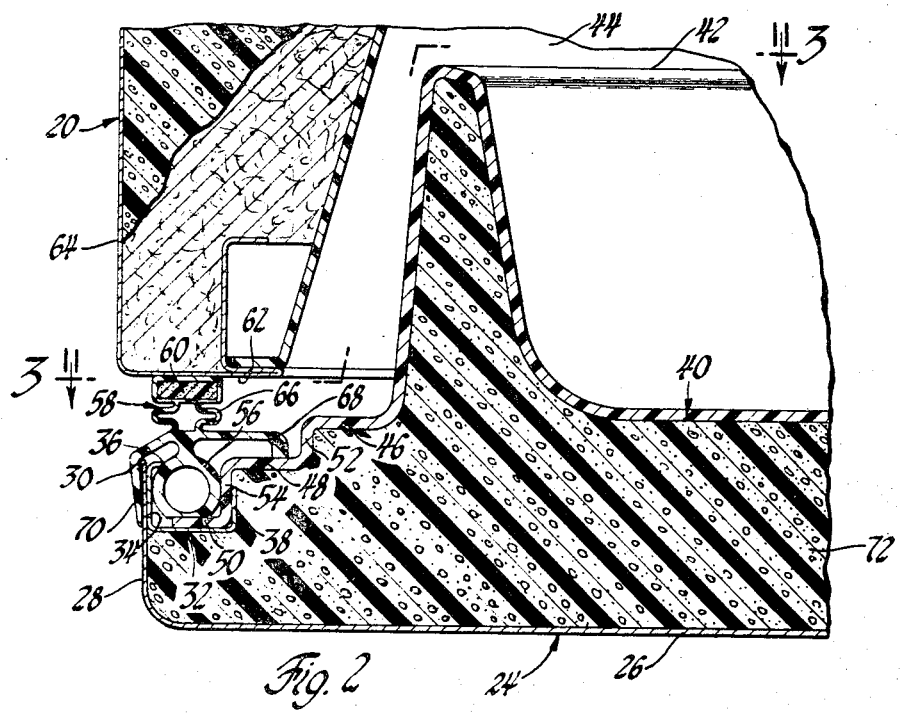
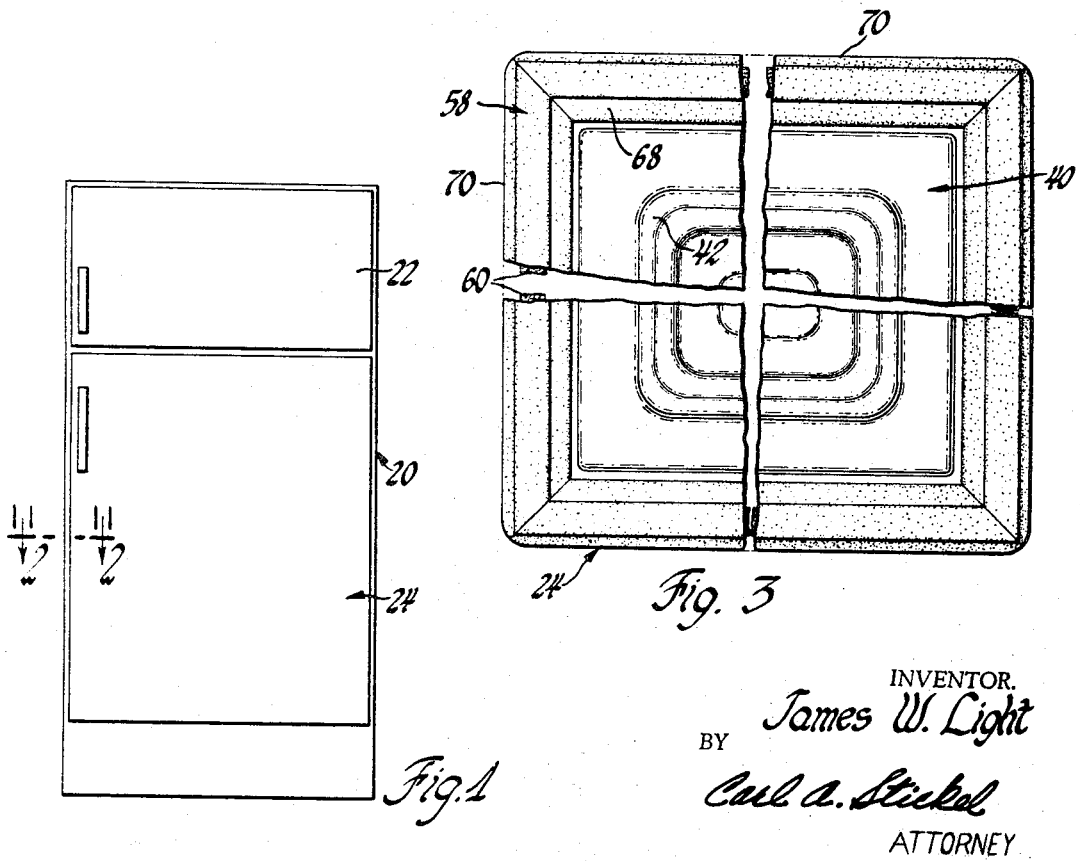
INVENTOR.
James W. Light
BY
Carl A. Stickel
ATTORNEY

United States Patent Office 3,403,477
Patented Oct. 1, 1968

3,403,477
DOOR CONSTRUCTION
James W. Light, Greenville, Ohio, assignor to General Motors Corporation, Detroit, Mich., a corporation of Delaware
Filed Sept. 14, 1966, Ser. No. 579,326
5 Claims. (Cl. 49—486)

ABSTRACT OF THE DISCLOSURE

A door construction comprising, a plastic inner face member having an L-shaped peripheral flange which fits into a rearwardly facing channel extending around the inner periphery of the rearwardly extending edges of an outer sheet metal face member. The L-shaped flange is held against the inner side and the bottom of the channel by a resilient tubular anchoring portion of a gasket seal which is pressed into the channel and held in place by an inwardly turned flange at the top of the outer side of the channel.

---

This invention pertains to a simple insulated door construction which can be assembled easily and quickly.

The flanged periphery of the inner face member is held on a cooperating inner flange by the resilient anchoring portion of the gasket seal which, in turn, is held in place by the inturned flange at the rear edge of the rearwardly turned sides of the outer face member of the door.

At present, substantially all insulated doors on household refrigerators are assembled together with metal strips and screws which hold the gasket seal in place and connect the inner and outer face members as shown in United States Patent No. 3,048,902 issued Aug. 14, 1962. The labor required to thread each of the screws in place is expensive and makes the cost of the doors unnecessarily high. Also, this type of construction does not take full advantage of the adhesive properties of foam insulation.

It is an object of this invention to provide an economical sturdy insulated door construction in which the number of threaded fastenings and the labor and material costs are kept at a minimum.

It is another object of this invention to provide an economical sturdy insulated door construction in which the edges of the inner and outer faces and the anchoring portion of the gasket seal are interfitted into assembled relationship merely by placing and pressing the parts together.

It is another object of this invention to provide an economical sturdy insulated door construction in which the periphery of the outer face member is provided with a channel arrangement which receives and holds the periphery of the inner face and the anchoring portion of the gasket seal.

These and other objects are attained in the form shown in the drawings in which the outer sheet metal face member is provided with rearwardly extending edges within which is welded a rearwardly facing channel having an inwardly extending lip. The inner face member is of plastic sheet and in addition to a stiffening rib has a peripheral flange which is L-shaped and fits into the channel well around its periphery and rests against the inner side and bottom of the channel. The gasket seal is provided with a tubular anchoring portion which is pressed into the channel on top of the peripheral flange of the inner face member. It is held in place by the inwardly turned flange of the channel member. The tubular anchoring portion of the gasket seal is squeezed into position to allow it to move past the inwardly projecting flange. The gasket seal has between its magnetic seal portion and the anchoring portion, one flange extending inwardly into contact with the inner face member and a second extending outwardly and overlapping the periphery of the outer face member. This conceals the channel member and provides an attractive appearance.

Further objects and advantages of the present invention will be apparent from the following description, reference being had to the accompanying drawings wherein preferred embodiments of the present invention are clearly shown.

In the drawings:
FIGURE 1 is a front view of a household refrigerator cabinet having a door embodying one form of my invention;
FIGURE 2 is a fragmentary horizontal enlarged section taken along the line 2—2 of FIGURE 1; and
FIGURE 3 is an enlarged rear view of the door.

Referring now to the drawings and more particularly to FIGURES 1 and 2, there is shown a household refrigerator cabinet 20 provided with an upper insulated door 22 and a lower insulated door 24. The four edges of the outer sheet metal face member 26 of the door 24 are bent rearwardly to form the the rearwardly extending flange 28 which terminates in the sharp edge 30. To provide an easy simple economical way to fit the parts of the door together I weld to the inner face of the flange 28 adjacent the edge 30 a U-shaped sheet metal channel member 32 having a long side 34 bonded to the flange 28 and provided at its inner end with a narrow inturned continuous lip or flange 36. The inner side 38 of the channel may be shorter than either the yoke portion or the other side. This channel member has the further advantage that it provides added stiffness and strength to the outer sheet metal face member 26 so that this face member may be made of very thin metal.

The inner face member 40 is made of plastic sheet metal such as acrylic butadiene styrene co-polymer having a large inwardly extending stiffening rib 42 extending around the door within the door opening 44 of the cabinet 20. The inner face member 40 outside the rib 42 is provided with three step flanges 46, 48 and 50 which stiffens the periphery of the inner face member 40 and provides a pleasing appearance. These flanges 46, 48 and 50 are connected by portions 52 and 54 extending at 90° to them.

According to my invention, the flange 50 at the periphery of the inner face member 40 is inserted into the channel member 32 and rests upon the yoke thereof. The 90° connecting portion 54 rests against the inner face of the inner side wall 38 of the channel member. This provides a firm support which assures the proper interfitting of the inner and outer face members 40 and 26. The flange 50 is held in place by the tubular anchoring portion 56 of the magnetic gasket seal 58 which has a magnetic seal portion 60 magnetically attracted by the inturned front face 62 of the outer sheet steel wall 64 of the cabinet. The magnetic seal portion 60 is connected by a bellows type section 66 to the tubular anchoring section 56 of the seal, which is held in place in the channel on top of the flange 50 by the inturned continuous lip or flange 36. The gasket seal 58 is made of flexible vinyl plastic or other flexible plastic material so that the tubular anchoring portion can be readily squeezed between the inner edge of the flange 36 and the connecting portion 54 against the flange 50 to locate the peripheral edge of the inner face member 40 in the channel member 32 in order to interlock with the outer face member 26.

The crack or seam between the tubular anchoring portion 56 and the connecting portion 54 is covered by providing the portion of the gasket seal between the bellows portion 66 and the anchoring portion 56 with an integral flange 68 which extends laterally inwardly and has a forwardly extending bead which extends into contact with the flange 48 of the inner face member 40. Opposite the flange 68, the gasket seal 58 is provided with a second integral flange 70 which extends over the flange 36 and the sharp edge 30 over the inner portion of the peripheral flange 28 of the inner face member 26. This flange 70 may be tapered toward the front of the door for a more attractive appearance.

To complete the door, the interior space between the outer face member 26 and the inner face member 40 is filled with polyurethane foam 72. This foam supports the thin sheet metal outer face member 26 as well as the inner plastic face member 40 so as to provide a very solid door which is very light in weight and has a high insulating value. The polyurethane adheres to the inner and outer face members 26 and 40 and assists in holding the flange 50 in the bottom of the channel 32. However, other foam insulation materials and other types of insulating materials may be used, if desired. If desired, the gasket 50 can be removed by pulling the anchoring portion out from the space within the flange 36 by causing the anchoring portion to be squeezed sufficiently to allow it to be moved past the flange 36. A new gasket seal may then be inserted by pushing the anchoring portion thereof past the flange 36 into the space within the channel 32. Thus, the door can be readily assembled and insulated without the use of screws or other pin type fastening means.

While the embodiment of the invention as herein disclosed constitutes a preferred form, it is to be understood that other forms might be adopted.

What is claimed is as follows:

1. An insulated door including an outer face member having peripheral edges, wherein the improvement comprises providing said edges with a channel arrangement having an open side facing away from said outer face member, an inner face member spaced away from said outer face member and having flange portions extending into said channel arrangement, a door seal gasket member having an anchoring portion extending into said channel arrangement and overlying and contacting said flange portions and a gasket sealing portion connected to said anchoring portion located outside said channel arrangement, insulating means between said face members, the outer portion of said channel arrangement being provided with an inturned flange overlying the adjacent part of said anchoring portion for holding said anchoring portion and said flange portions in said channel arrangement.

2. An insulated door including an outer face member having peripheral edges extending rearwardly therefrom, wherein the improvement comprises providing a first inturned flange at the rear of said peripheral edges and a second inwardly extending flange extending inwardly from said peripheral edges between said first inturned flange and the outer face of said outer face member, an inner face member spaced away from said outer face member and having its edges formed into an L-shaped flange having an inner leg extending substantially transverse to the outer face of said outer face member and having an outer leg turned outwardly from said inner leg toward said peripheral edges and resting against the rear face of said second inwardly extending flange, a door seal gasket member having a resilient anchoring portion lodged between and contacting said inner leg and said outer outwardly extending leg and said first inturned flange, said anchoring portion having a transverse dimension greater than the least distance between said first inturned flange and said inner leg whereby said first inturned flange overlies the adjacent part of said anchoring portion and holds said anchoring portion and the outer leg between it and said second flange, said gasket seal member having a sealing portion rearwardly of said first inturned flange connected to said anchoring portion.

3. An insulated door as defined in claim 2 in which the portion of said door seal gasket member between said anchoring portion and said gasket sealing portion is provided with a laterally extending flange extending inwardly and overlying and contacting the adjacent portions of said inner face member.

4. An insulated door as defined in claim 2 in which the portion of said door seal gasket member between said anchoring portion and said gasket sealing portion is provided with an outwardly extending flange extending over and overlying and contacting a substantial portion of said peripheral edges of said outer face member.

5. An insulated door including an outer face member having peripheral edges extending rearwardly therefrom, a first inturned flange at the rear of said peripheral edges and a second inwardly extending flange extending inwardly from said peripheral edges between said first inturned flange and the outer face of said outer face member, wherein the improvement comprises an inner face member spaced away from said outer face member and having its edges formed into an L-shaped flange having an inner leg extending substantially transverse to the outer face of said outer face member and having an outer leg turned outwardly from said inner leg toward said peripheral edges and resting against the rear face of said second inwardly extending flange, said second flange having an additional flange at its inner edge extending along the inner face of said inner leg, a door seal gasket having a resilient anchoring portion lodged between said inner and outer legs and said first inturned flange and a portion of said peripheral edges between said first inturned flange and said outer leg, said anchoring portion having a transverse dimension greater than the nearest distance between said first inturned flange and said inner leg whereby said first inturned flange overlies the adjacent part of said anchoring portion and holds said anchoring portion and the outer leg between it and said second flange, said gasket seal member having a sealing portion rearwardly of said first inturned flange connected to said anchoring portion.

References Cited

UNITED STATES PATENTS

| | | | |
|---|---|---|---|
| 2,276,742 | 3/1942 | Schmidt | 49—487 |
| 2,335,185 | 11/1943 | Hull | 49—486 X |
| 2,406,629 | 8/1946 | Petkwitz | 49—486 |
| 2,507,305 | 5/1950 | Jacobs | 49—486 |
| 2,786,241 | 3/1957 | Garvey et al. | 49—486 |
| 3,226,367 | 12/1965 | Monti | 49—489 X |
| 3,289,352 | 12/1966 | Heilweil et al. | 49—478 X |

DAVID J. WILLIAMOWSKY, *Primary Examiner.*

P. C. KANNAN, *Assistant Examiner.*